United States Patent [19]

Metzger

[11] Patent Number: 5,775,648
[45] Date of Patent: Jul. 7, 1998

[54] PORTABLE CONDUIT RETENTION APPARATUS FOR RELEASABLY RETAINING A CONDUIT THEREIN

[75] Inventor: Richard H. Metzger, West Seneca, N.Y.

[73] Assignee: The United States of America as represented by the United States Department of Energy, Washington, D.C.

[21] Appl. No.: 703,179

[22] Filed: Aug. 26, 1996

[51] Int. Cl.[6] .................................................. F16L 3/22
[52] U.S. Cl. .................................. 248/68.1; 211/60.1
[58] Field of Search .............................. 248/68.1, 67.5, 248/56, 65, 73, 74.1, 74.4, 89, 230.4, 316.5, 231.51, 229.13, 229.23; 211/60.1, 171

[56] References Cited

U.S. PATENT DOCUMENTS

| | | | |
|---|---|---|---|
| 2,957,583 | 10/1960 | Busbridge | 211/60.1 |
| 3,612,286 | 10/1971 | Langowski | 211/60.1 |
| 4,775,121 | 10/1988 | Carty | 248/68.1 |
| 5,129,839 | 7/1992 | Vanskiver | 439/367 |
| 5,184,794 | 2/1993 | Saito | 248/68.1 |
| 5,335,887 | 8/1994 | Torrens et al. | 248/49 |
| 5,354,952 | 10/1994 | Hickey | 174/48 |
| 5,383,318 | 1/1995 | Kelley et al. | 52/287 |
| 5,411,297 | 5/1995 | Brown | 285/62 |

*Primary Examiner*—Ramon O. Ramirez
*Assistant Examiner*—Anita M. King
*Attorney, Agent, or Firm*—Joy Alwan; Thomas G. Anderson; William R. Moser

[57] ABSTRACT

Portable conduit retention apparatus for releasably retaining a conduit therein. The apparatus releasably retains the conduit out of the way of nearby personnel and equipment. The apparatus includes a portable support frame defining a slot therein having an open mouth portion in communication with the slot for receiving the conduit through the open mouth portion and into the slot. A retention bar is pivotally connected to the support frame adjacent the mouth portion for releasably retaining the conduit in the slot. The retention bar freely pivots to a first position, so that the mouth portion is unblocked in order that the conduit is received through the mouth portion and into the slot. In addition, the retention bar freely pivots to a second position, so that the mouth portion is blocked in order that the conduit is retained in the slot. The conduit is released from the slot by pivoting the retention bar to the first position to unblock the mouth portion and thereafter manipulating the conduit from the slot and through the mouth portion. The apparatus may further include a mounting member attached to the support frame for mounting the apparatus on a vertical support surface. Another embodiment of the apparatus includes a shoe assembly of predetermined weight removably connected to the support frame for resting the apparatus on a floor in such a manner that the apparatus is substantially stationary on the floor.

10 Claims, 6 Drawing Sheets

PORTABLE CONDUIT RETENTION APPARATUS FOR RELEASABLY RETAINING A CONDUIT THEREIN

BACKGROUND OF THE INVENTION

This invention generally relates to bracket apparatus for supporting conduits and more particularly relates to a portable conduit retention apparatus for releasably retaining a plurality of conduits, such as electrical cables, in a predetermined location out of the way of nearby traveling equipment which would otherwise encounter the conduits.

Analytical laboratory sampling rooms typically contain electrical equipment used for remote sample preparation and analysis of radioactive, toxic or hazardous substances. Electricity is supplied to the equipment by means of a plurality of electrical cables or conduits extending into the sampling room. Usually these electrical conduits merely lay on the floor of the sampling room because it is cost-prohibitive to remotely connect and thereafter disconnect, as necessary, each conduit to and from the walls inside the sampling room. However, movement of carts or transportation devices, which may carry equipment and sampling supplies within the sampling room, is often impeded because the transportation devices must repetitively cross the conduits laying on the floor of the sampling room.

In order to allow unimpeded free movement of the transportation devices within the sampling room, expensive remotely operated manipulators repetitively grasp and move the conduits out of the path of the traveling transportation devices. However, applicant has observed that frequent manipulation and handling of the conduits increase the risk that the conduits will become frayed and eventually break. Due to the radioactive, hazardous or toxic environment of such sampling rooms, repair or replacement of damaged conduits must be done remotely, thereby increasing maintenance costs.

Moreover, conduits laying on the floor of the sampling room occupy space that might otherwise be used for other, more productive, purposes.

Therefore, a problem in the art has been to remotely retain the conduits at an out-of-the-way location within the sampling room so that the electrical conduits do not interfere with the free movement of transportation devices, while simultaneously reducing manipulation of the conduits to avoid damage to the conduits.

Cable retention devices are known. A cable retention and accommodation apparatus having the dual functions of providing a support for a wall panel and providing a support for cables located behind the panel is disclosed in U.S. Pat. No. 5,383,318 titled "Raceway Cable Retention And Accommodation Apparatus" issued Jan. 24, 1995 in the name of James O. Kelley, et al. This patent discloses a cable retention and accommodation apparatus for a modular wall system configured to create individual work stations in an office or hospital-like environment. The Kelley, et al. device comprises a cover attached to a C-shaped bracket connected to a support surface, such as a post. One embodiment of the apparatus defines an inner conduit space which, according to this patent, provides for improved capacity for retaining cables. Another embodiment of the apparatus includes a bracket comprising a mounting portion, a first leg connected to the mounting portion, a second leg connected to the first leg, and a third leg connected to the second leg. In this second embodiment of the Kelley et al. device, the mounting portion and the first, second, and third legs are configured so as to define a J-shaped structure. The J-shaped bracket is attached to the support surface by a mounting device. This mounted bracket also allows for increased cable capacity during the process of "laying-in" cable for the wall/panel system. Although the Kelly, et al. patent may disclose a cable retention and accommodation apparatus, this patent does not disclose a portable conduit retention apparatus adapted to releasably retain a plurality of conduits therein.

Therefore, what is needed is a portable conduit retention apparatus for releasably retaining a plurality of conduits, such as electrical cables, in a predetermined location out of the way of nearby traveling equipment which would otherwise encounter the conduits.

SUMMARY OF THE INVENTION

Disclosed hereinbelow is a portable conduit retention apparatus for releasably retaining a conduit therein, comprising portable conduit support means for supporting the conduit, the conduit support means adapted to receive the conduit therethrough; and releasable retention means pivotally connected to the conduit support means for releasably retaining the conduit in the conduit support means.

More specifically, the present invention includes a portable support frame defining a slot therein having an open mouth portion in communication with the slot for receiving the conduit through the open mouth portion and into the slot. A retention bar is pivotally connected to the support frame adjacent the mouth portion for releasably retaining the conduit in the slot. The retention bar freely pivots to a first position, so that the mouth portion is unblocked in order that the conduit is received through the mouth portion and into the slot. In addition, the retention bar freely pivots to a second position, so that the mouth portion is blocked in order that the conduit is retained in the slot. The conduit is released from the slot by pivoting the retention bar to the first position to unblock the mouth portion and thereafter manipulating the conduit from the slot and through the mouth portion. The invention further includes a mounting member attached to the support frame for mounting the apparatus on a vertical support surface. Another embodiment of the invention includes ballast means, such as a shoe assembly of predetermined weight removably connected to the support frame for resting the apparatus on a floor in such a manner that the apparatus is substantially stationary on the floor.

An object of the present invention is to provide an apparatus for releasably retaining a plurality of conduits in a predetermined out of the way location to allow free movement of transportation devices.

A feature of the present invention is the provision of a portable support frame for supporting the conduit, the support frame defining a slot therein receiving the conduit in combination with a retention bar pivotally connected to the support frame and adjacent the slot for releasably retaining the conduit in the slot.

An advantage of the instant invention is that use of the invention allows conduits to be removed to and maintained at a location where they do not interfere with the free movement of traveling equipment and transportation devices.

Another advantage of the instant invention is that use thereof reduces the need to manipulate the conduits and thus avoids the risk that the conduits will fray and eventually break.

Yet another advantage of the instant invention is that use thereof allows conduits having different functions (e.g., electrical power supply conduits, instrumentation conduits, e.t.c.) to be segregated for convenient later identification.

Still another advantage of the instant invention is that use thereof increases usable floor space in the sampling room.

These and other objects, features, and advantages of the present invention will become apparent to those skilled in the art upon a reading of the following detailed description when taken in conjunction with the drawings wherein there is shown and described illustrative embodiments of the invention.

DETAILED DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

FIG. 1 is a front view in elevation of a first embodiment of the invention, which is a portable conduit retention apparatus for releasably retaining a plurality of conduits, such as electrical cables (shown in phantom), in a predetermined location out of the way of nearby traveling equipment which would otherwise encounter the conduits, the first embodiment of the invention having a support frame removably mounted on a vertical support surface above the floor of a sampling room, this view also showing a plurality of slots formed in the support frame for supporting respective ones of the conduits extending through the slots;

Figure 4:
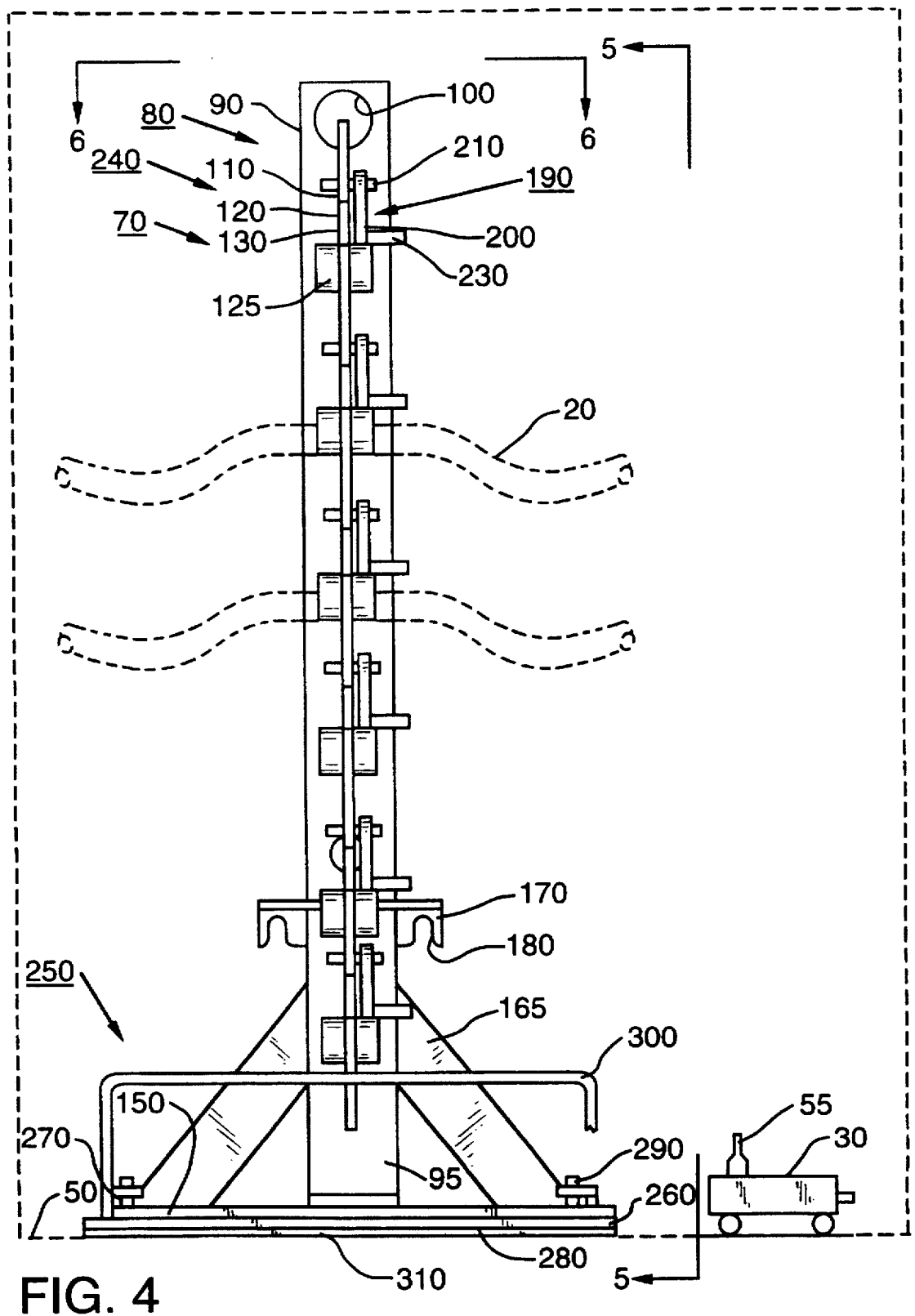
Figure 5:
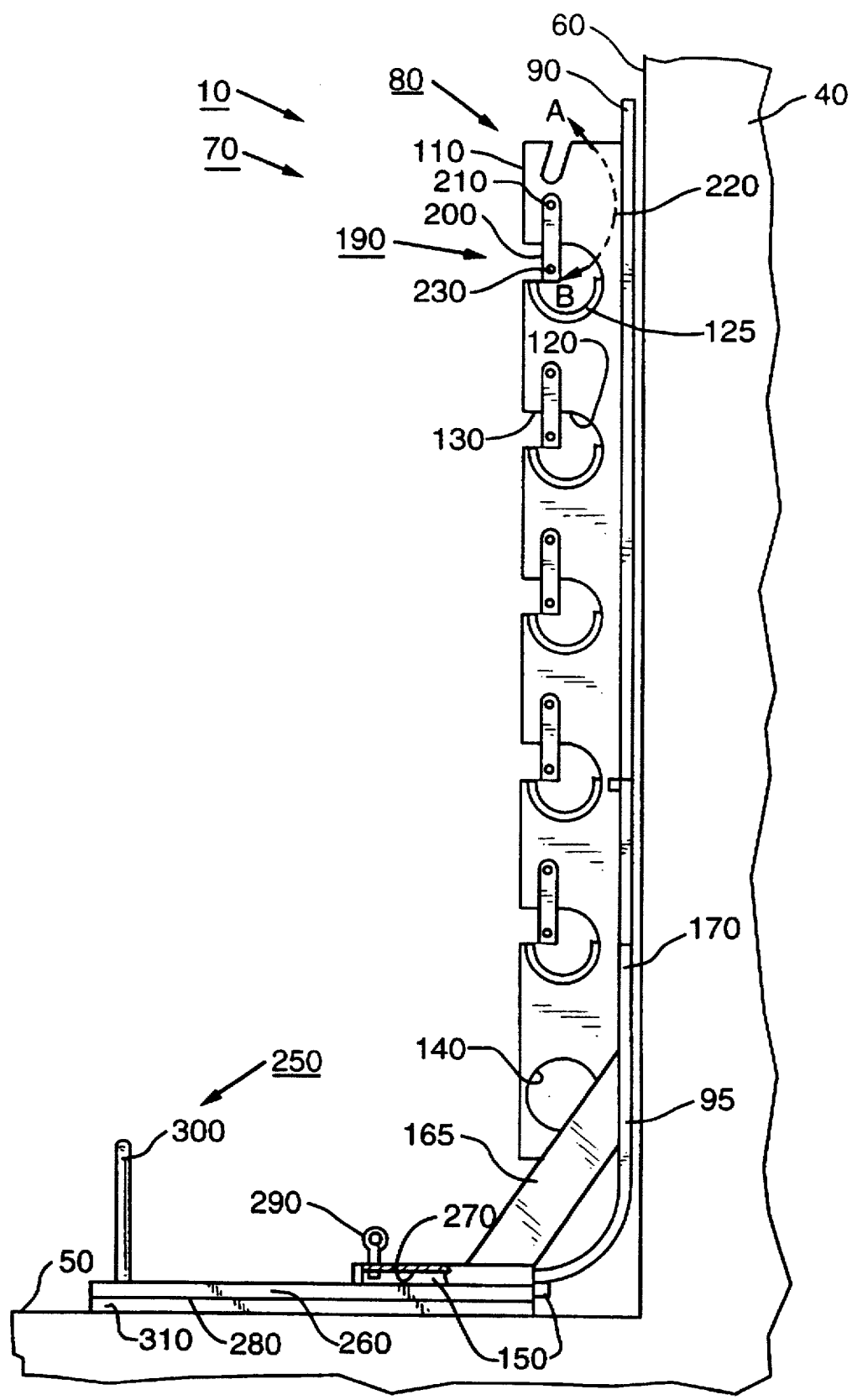

FIG. 4 is a front view in elevation of a second embodiment of the invention, which is a portable conduit retention apparatus for releasably retaining a plurality of conduits, such as electrical cables (shown in phantom), in a predetermined location out of the way of nearby traveling equipment which would otherwise encounter the conduits, the second embodiment of the invention having a support frame being removably connected to a shoe assembly resting on the floor of the sampling room;

FIG. 5 is a view taken along section line 5—5 of FIG. 4; and

Figure 6:
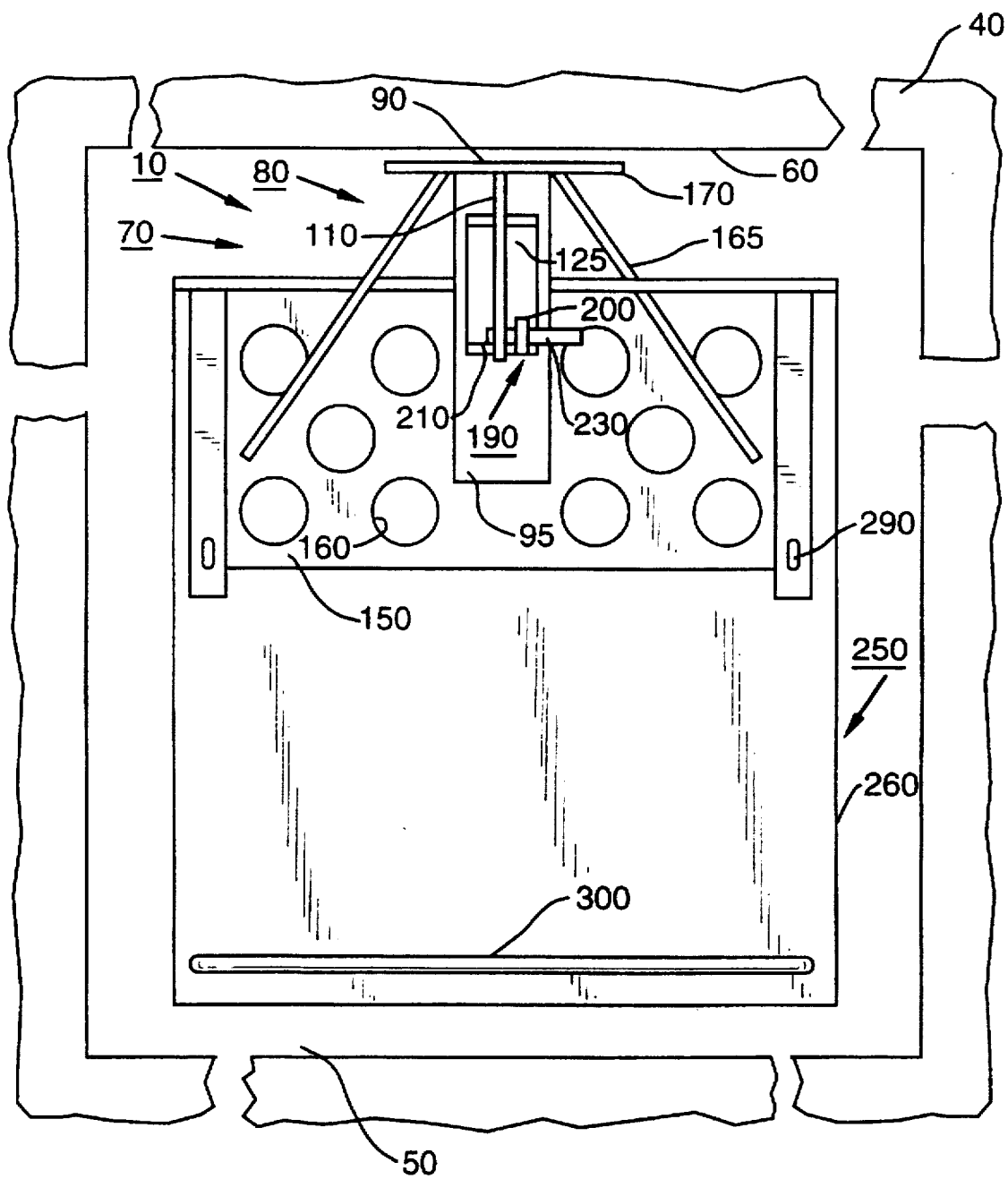

FIG. 6 is a view taken along section line 6—6 of FIG. 4.

DESCRIPTION OF THE PREFERRED EMBODIMENTS

Figure 1:
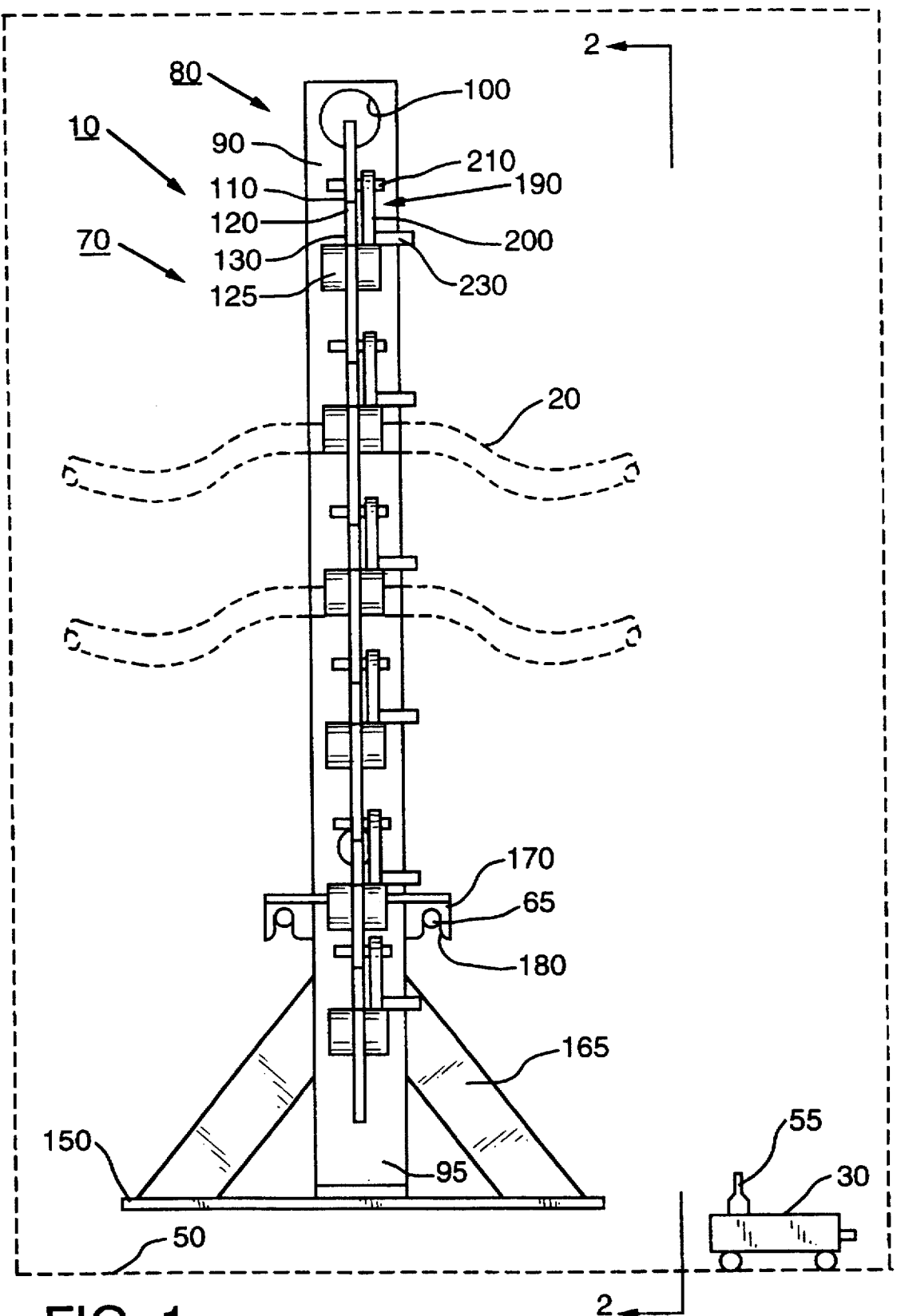
Figure 2:
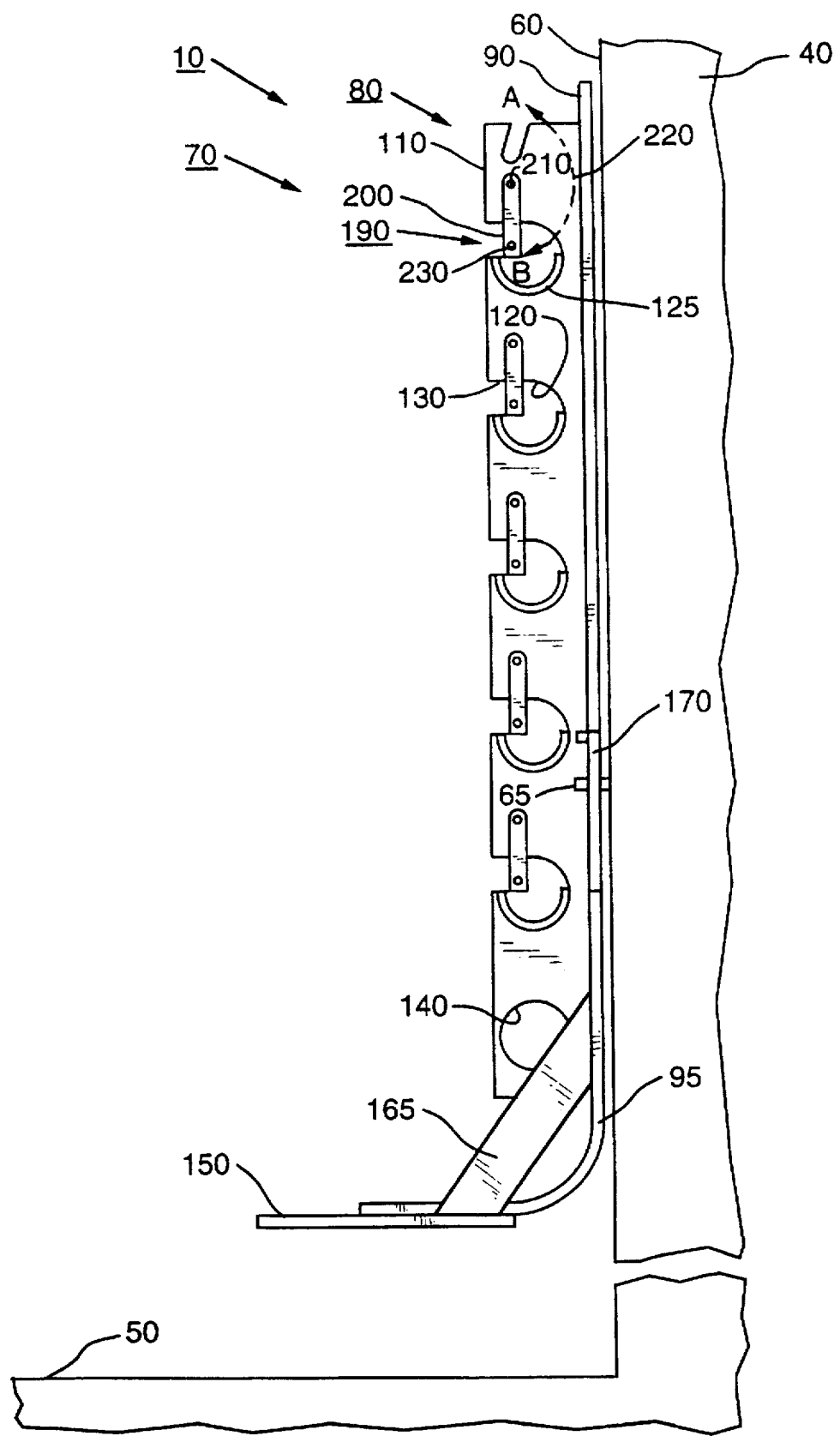
FIG. 2 is a view taken along section line 2—2 of FIG. 1.
Figure 3:
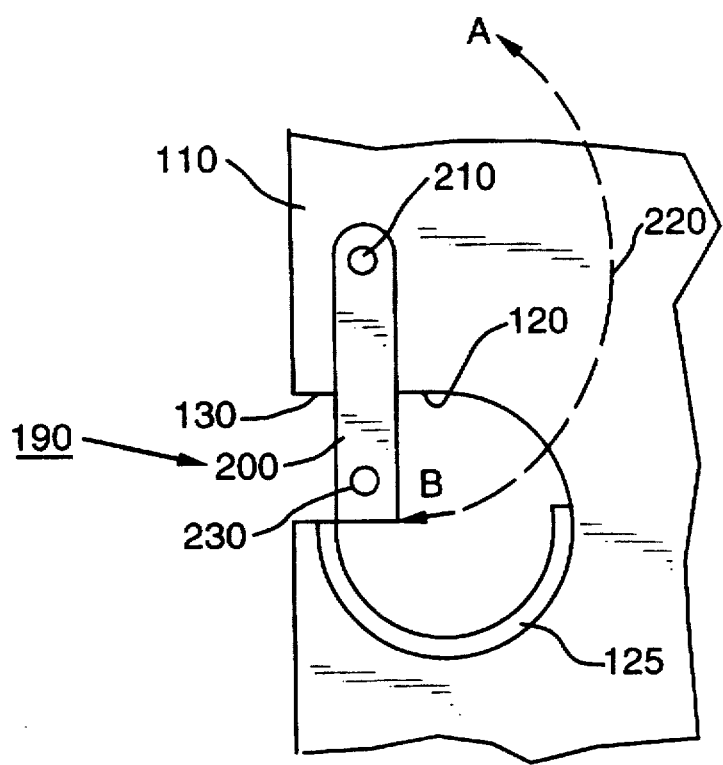
FIG. 3 is a fragmentation view of the support frame showing one of the slots and a pivoting retention bar connected to the support frame adjacent the slot for allowing the conduit to be received into the slot as the retention bar pivots to a first position and for releasably retaining the conduit in the slot as the retention bar pivots to a second position.

Referring to FIGS. 1, 2 and 3, there is shown the first embodiment of the present invention, which is a portable conduit retention apparatus, generally referred to as 10, for releasably retaining a plurality of conduits 20 in a predetermined location out of the way of nearby traveling equipment 30 (e.g., a traveling cart or other transportation device) which would otherwise encounter conduits 20. The conduits 20 may be electrical cables extending from a power supply (not shown) located outside a laboratory analytical sampling cell or room 40 to a plurality of analytical sampling devices (not shown) disposed in room 40. The sampling devices are used to sample and analyze a sample 55 of a radioactive or otherwise toxic or hazardous substance (not shown). In this regard, room 40 is sealed, and requires any operations occurring within room 40 to be performed remotely, such as with the aid of remotely operated manipulators (also not shown). Room 40 includes a floor 50 and a wall or vertical support surface 60, which support surface 60 may have a stud 65 outwardly projecting therefrom and elevated a predetermined distance above floor 50.

Referring again to FIGS. 1, 2 and 3, apparatus 10 comprises portable conduit support means, generally referred to as 70, for supporting conduits 20. As described in more detail presently, conduit support means 70 is adapted to receive conduits 20 therethrough. In this regard, conduit support means 70 comprises a portable support frame, generally referred to as 80. Support frame 80 includes an elongate rectangularly-shaped spine member 90, which is shown in the several figures as vertically oriented. Spine member 90 may include a plurality of holes 100 (only two of which are shown) therethrough for reducing the weight thereof, so that apparatus 10 is more easily portable by means of the previously mentioned remotely operated manipulators. Spine member 90 also includes an end portion 95 for reasons disclosed hereinbelow. It is understood by the person of ordinary skill in the art to which the instant invention pertains that holes 100 are sized to reduce the weight of spine member 90 without compromising the structural integrity of spine member 90.

Still referring to FIGS. 1, 2 and 3, support frame 80 further includes an elongate rectangularly-shaped rib member 110 integrally attached to spine member 90, such as by welding, and outwardly projecting therefrom. Rib member 110 defines a plurality of generally circular slots 120 therein. Each slot 120 has an associated open mouth portion 130 in communication with slot 120 for receiving a predetermined one of conduits 20 through open mouth portion 130 and into slot 120, so that conduit 20 rests in slot 120. Moreover, extending through each slot 120 may be a curved trough or sheath 125 integrally attached, such as by welding, to rib member 110 along the lower marginal edge of slot 120. Sheath 125 prevents wearing of conduit 20 on the lower marginal edge of slot 120 as conduit 20 extends through slot 120. Sheath 125, which may be formed from a longitudinally cut pipe section, has a semi-circular transverse cross section to conform to the generally circular contour of slot 120. Thus, when conduit 20 is received in slot 120, it is cradled by sheath 125. In addition, the exposed marginal edges of sheath 125 may be deburred and rounded to prevent wearing of conduit 20 on the edges of sheath 125. Rib member 110 may include a plurality of holes 140 (only one of which is shown) therethrough for reducing the weight thereof, so that apparatus 10 is more easily portable by means of the previously mentioned remotely operated manipulators. It is understood by the person of ordinary skill in the art to which the instant invention pertains that holes 140 are sized to reduce the weight of rib member 110 without compromising the structural integrity of rib member 110.

Referring yet again to FIGS. 1, 2 and 3, support frame 80 also includes a generally rectangularly-shaped foot member 150 integrally attached, such as by welding, to the previously mentioned end portion 95 of spine member 90 and perpendicularly outwardly projecting therefrom. Although foot member 150 allows apparatus 10 to rest on floor 50 while supporting conduits 20, foot member 150 finds its preferred use with the second embodiment of the invention, as described in detail hereinbelow. Moreover, foot member 150 may include a plurality of holes 160 (only ten of which are shown) therethrough for reducing the weight thereof, so that apparatus 10 is more easily portable by means of the previously mentioned remotely operated manipulators. It is understood by the person of ordinary skill in the art to which the instant invention pertains that holes 160 are sized to reduce the weight of foot member 150 without compromising the structural integrity of foot member 150.

Referring again to FIGS. 1, 2 and 3, apparatus 10 may further comprise a brace 165 interconnecting spine member 90 and foot member 150 for bracing spine member 90, so that the structural rigidity of support frame 80 is enhanced.

Referring to FIGS. 1 and 2, apparatus 10, belonging to the first embodiment of the invention, further comprises mounting means, such as a mounting member 170 integrally connected, such as by welding or screws, to spine member 90 for removably mounting apparatus 10 to support surface 60. Mounting member 170 preferably has a cut-out 180 therethrough for removably receiving stud 65, so that apparatus 10 may be mounted on support surface 60 and suspended therefrom at a predetermined distance above floor 50.

Returning to FIGS. 1, 2 and 3, apparatus 10 also comprises releasable retention means, generally referred to as 190, pivotally connected to rib member 110 for releasably retaining conduits 20 in rib member 110, which rib member 110 belongs to support frame 80. Retention means 190 comprises a plurality of retention members or retention bars 200 and a plurality of pivot pins 210. Each retention bar 200 is pivotally connected to its respective pivot pin 210, which is in turn connected to rib member 110 at a location adjacent open mouth portion 130. As best seen in FIGS. 2 and 3, each retention bar 200 is capable of freely pivoting to-and-fro about its respective pivot pin 210 generally in the direction of the curved arrow 220. Thus, retention bar 200 is adapted to freely pivot to a first position "A", so that a predetermined one of the conduits 20 is received through mouth portion 130 and into slot 120. Of course, conduit 20 may be placed within slot 120 such as by means of the previously mentioned remotely operated manipulators. Retention bar 200 is thus also adapted to freely pivot to a second position "B", so that conduit 20 is releasably retained in slot 120. It is understood by a person of ordinary skill in the art to which the instant invention pertains that when retention bar 200 pivotally arrives at second position "B" it is estopped from further pivoting movement due to the presence of sheath 125, which extends through slot 120, in order to retain conduit 20 in slot 120. More specifically, conduit 20 is releasably retained in slot 120 in the sense that conduit 20 is prevented from exiting slot 120 through mouth portion 130 due to the interference of retention bar 200 after retention bar 200 has been pivoted to position "B" and estopped thereat as it abuts sheath 125. In other words, retention bar 200 is adapted to pivot to position "A" to unblock mouth portion 130 in order to allow passage of conduit 20 through mouth portion 130 and into slot 120 to be cradled by sheath 125. Conversely, retention bar 200 is also adapted to pivot to position "B" to block mouth portion 130 in order to prevent passage of conduit 20 out of slot 120 and through mouth portion 130. Of course, in order to release conduit 20 from slot 120, retention bar 200 is again pivoted to position "A" and conduit 20 is manipulated out of slot 120 and through mouth portion 130, such as by means of the previously mentioned remotely operated manipulators. Retention bar 200 may include a lever 230 for conveniently pivoting retention bar 200, such as by means of the previously mentioned remotely operated manipulators which are capable of grasping and then moving lever 230. Moreover, apparatus 10 may be made of stainless steel for resisting corrosion and to allow for convenient decontamination should any radioactive, toxic or hazardous substance adhere to apparatus 10.

Therefore, according to the first embodiment of the invention, apparatus 10 is preferably mounted on support surface 60 a predetermined distance above floor 50 as slots 120 receive respective ones of the conduits 20. In this manner, conduits 20 will not lay on floor 50 to impede or interfere with the free movement of traveling equipment 30. It is understood by a person of ordinary skill in the art to which the instant invention pertains that, depending on the length of conduits 20, a plurality of spaced-apart apparatus 10 may be suspended from support surface 60 at predetermined locations to maintain conduits 20 in an out of the way location. It is also understood by a person of ordinary skill in the art to which the instant invention pertains that apparatus 10 is portable in the sense that it may be manipulated and mounted on support surface 60 anywhere within room 40.

Turning now to FIGS. 4, 5 and 6, there is shown a second embodiment of the instant invention, which is a portable conduit retention apparatus, generally referred to as 240, for releasably retaining the plurality of conduits 20 in a predetermined location out of the way of nearby traveling equipment 30 which would otherwise encounter the conduits. Apparatus 240, which forms the second embodiment of the invention, is identical to the first embodiment of the invention (i.e., apparatus 10), except that apparatus 240 comprises ballast means, such as a shoe assembly generally referred to as 250, of predetermined weight removably connected to support frame 80 for adding ballast (i.e., weight) to and removing ballast from support frame 80, so that support frame 80 is respectively stationary and movable on floor 50. Thus, in this second embodiment of the invention, apparatus 240 preferably rests on floor 50 rather than being suspended from support surface 60. More specifically, shoe assembly 250 comprises a base 260 defining a cavity 270 therein sized to slidably removably receive the previously mentioned foot member 150. Base 260 also has an underside surface 280 for resting support frame 80 on floor 50. Shoe assembly 250 further comprises at least one removable fastener 290, such as a suitable cotter pin, interconnecting foot member 150 and base 260 for removably fastening foot member 150 to base 260. In other words, foot member 150 is manipulated into cavity 270, such as by means of the previously mentioned remotely operated manipulators, and releasably locked therein by fastener 290. Fastener 290 is capable of being removed from foot member 150 and base 260 to free foot member 150 from base 260 and thus to free foot member 150 from shoe assembly 250. Shoe assembly 250 may also comprise a puller bar 300 integrally attached to base 260 for pulling or manipulating apparatus 240 to its desired position within room 40. Moreover, apparatus 240 may further comprise a skid-resistant material 310, such as a suitable skid-resistant rubber or the like, overlaid on underside surface 280 of base 260, so that base 260 resists inadvertent skidding on floor 50 of room 40 until base 260 is intentionally pulled/manipulated on floor 50. Moreover, apparatus 240 may be made of stainless steel for resisting corrosion and to allow for convenient decontamination should any radioactive, toxic or hazardous substance adhere to apparatus 240.

Therefore, according to the second embodiment of the invention, apparatus 120 preferably rests on floor 50 as slots 120 receive respective ones of the conduits 20. In this manner, conduits 20 will not lay on floor 50 to impede or interfere with the movement of traveling equipment 30. It is understood by a person of ordinary skill in the art to which the instant invention pertains that, depending on the length of conduits 20, a plurality of spaced-apart apparatus 240 may be positioned on floor 50 at predetermined locations to maintain conduits 20 in an out of the way location. It is also understood by a person of ordinary skill in the art to which the invention pertains that apparatus 240 is portable in the sense that it may be manipulated and positioned on floor 50 anywhere within room 40.

It will be appreciated from the description hereinabove, that an advantage of the instant invention is that use of the invention allows conduits 20 to be removed to and retained at a location within room 40 where they do not interfere with the free movement of traveling equipment 30.

Another advantage of the instant invention is that use thereof reduces the need to repetitively manipulate conduits 20 in order to repeatedly reposition conduits 20 out of the path of traveling equipment 30. Reduced manipulation of conduits 20 avoids the risk that conduits 20 will become frayed over time and eventually break.

Yet another advantage of the instant invention is that use thereof allows conduits 20 having different functions (e.g., electrical power supply conduits, instrumentation conduits, e.t.c.) to be segregated into predetermined slots 120 for convenient later identification and tracking.

Still another advantage of the instant invention is that use thereof increases usable floor space because conduits 20 need no longer merely lay on floor 50; rather, conduits 20 are suspended in apparatus 10/240 in an out of the way location above floor 50.

Although the invention is illustrated and described herein in its preferred embodiments, it is not intended that the invention as illustrated and described be limited to the details shown, because various modifications may be obtained with respect to the invention without departing from the spirit of the invention or the scope of equivalents thereof. For example, although apparatus 10/240 are described for use in a laboratory analytical sampling room in connection with remotely operated manipulators, apparatus 10/20 may be used wherever it is desired to releasably retain conduits or cabling out of the way of personnel and equipment. Other alternative uses may be, for example, to relocate water hoses belonging to a fire truck, or to relocate power cables or pneumatic hoses belonging to construction equipment, in addition to other uses.

Therefore, what is provided is a portable conduit retention apparatus for releasably retaining a plurality of conduits, such as electrical cables, in a predetermined location out of the way of nearby traveling equipment which would otherwise encounter the conduits.

What is claimed is:

1. A portable conduit retention apparatus for releasably retaining a conduit therein, comprising:
   (a) portable conduit support means for supporting the conduit, said conduit support means adapted to receive the conduit therethrough;
   (b) releasable retention means pivotally connected to said conduit support means for releasably retaining the conduit in said conduit support means; and
   (c) ballast means of predetermined weight removably connected to said conduit support means for adding ballast to and removing ballast from said conduit support means, so that said conduit support means is respectively stationary and movable.

2. The conduit retention apparatus of claim 1, wherein said releasable retention means comprises a retention member adapted to freely pivot to a first position, so that the conduit is received into said conduit support means as said retention member pivots to the first position and adapted to freely pivot to a second position, so that the conduit is releasably retained in said conduit support means as said retention member pivots to the second position.

3. The conduit retention apparatus of claim 1, wherein said retention means is a retention bar.

4. The conduit retention apparatus of claim 1, further comprising mounting means attached to said conduit support means for removably mounting said conduit support means on a support surface.

5. A portable conduit retention apparatus for releasably retaining a conduit therein, comprising:
   (a) a portable support frame for supporting the conduit, said support frame defining a slot therein having an open mouth portion in communication with the slot for receiving the conduit through the open mouth portion and into the slot;
   (b) a retention bar pivotally connected to said support frame and adjacent the mouth portion for releasably retaining the conduit in the slot, said retention bar adapted to freely pivot to a first position, so that the conduit is received through the mouth portion and into the slot and adapted to freely pivot to a second position, so that the conduit is releasably retained in the slot as said retention bar pivots to the second position;
   (c) a mounting member connected to said support frame for removably mounting said support frame on a support surface;
   (d) a foot member attached to said support frame and outwardly projecting therefrom; and
   (e) a shoe assembly of predetermined weight slidably removably receiving said foot member for adding weight to and removing weight from said support frame, so that said support frame is respectively stationary and movable.

6. For use in a laboratory cell having a floor therein, a portable conduit retention apparatus for releasably retaining a plurality of conduits therein, comprising:
   (a) an elongate spine member;
   (b) an elongate rib member attached to said spine member and outwardly projecting therefrom for supporting the conduits, said rib member defining a plurality of slots therein each having an open mouth portion in communication with the slot for receiving a predetermined one of the conduits through the open mouth portion and into the slot, so that each of the conduits is supported thereby;
   (c) a plurality of pivot pins attached to said rib member, respective ones of said pivot pins disposed adjacent the open mouth portion of each slot; and
   (d) a plurality of retention bars pivotally connected to respective ones of said pivot pins for blocking and unblocking the open mouth portion of each slot, each of said retention bars adapted to freely pivot about said pivot pin to a first position to unblock the open mouth portion, so that the conduit is received through the open mouth portion and into the slot and adapted to pivot about said pivot pin to a second position to block the open mouth portion, so that the conduit is releasably retained in the slot as the retention bar pivots to the second position;
   (e) a mounting member connected to said spine member for removably mounting said spine member to a support surface having a stud outwardly protecting therefrom, said mounting member having a cut-out therethrough for removably receiving the stud;

(f) a foot member attached to said spine member and outwardly projecting therefrom; and (g) a shoe assembly of predetermined weight removably receiving said foot member for adding weight to and removing weight from said support frame, so that said support frame is respectively stationary and movable.

7. The conduit retention apparatus of claim 6, wherein said shoe assembly comprises:

(a) a base defining a cavity therein for slidably removably receiving said foot member, said base having an underside surface adapted to rest on the floor of the cell;

(b) a removable fastener interconnecting said foot member and said base for removably fastening said foot member to said base; and (c) a puller bar attached to said base for pulling said base move said base.

8. The conduit retention apparatus of claim 7, further comprising a skid-resistant material overlaid on the underside surface of said base, so that said base resists inadvertent skidding on the floor of the cell.

9. The conduit retention apparatus of claim 6, further comprising a sheath attached to said rib member and extending through the slot, said sheath interposed between a conduit and said rib member for avoiding wearing of the conduit as the conduit is received through the slot.

10. The conduit retention apparatus of claim 6, further comprising a brace interconnecting said spine member and said foot member for bracing said spine member.

* * * * *